Figure 1:
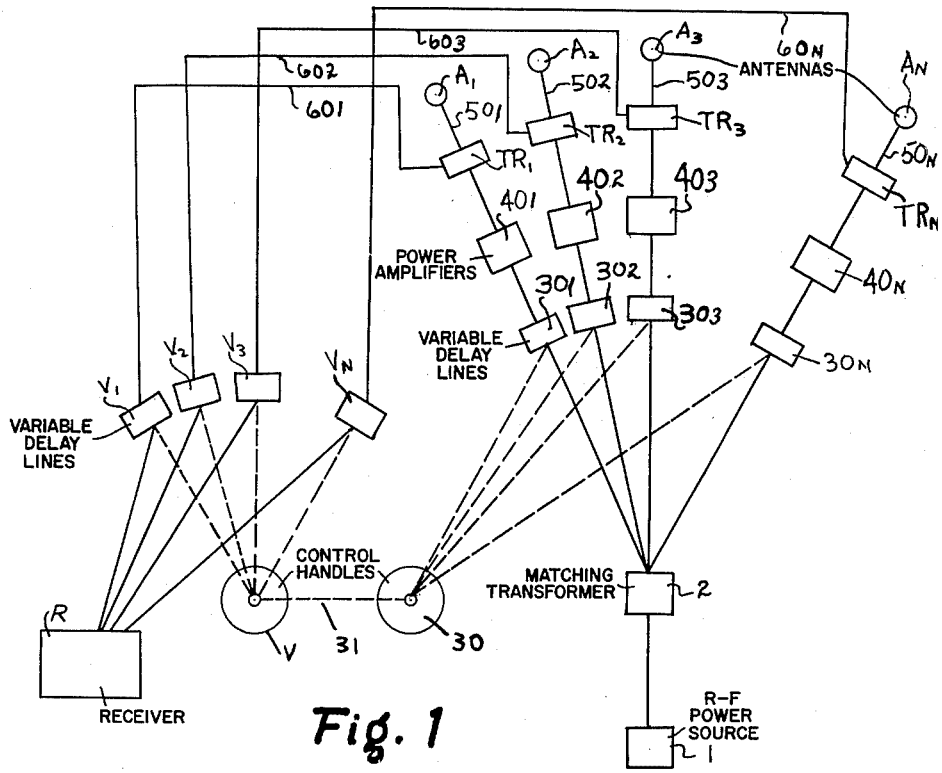

April 3, 1962

A. ALFORD 3,028,593

DEVICE FOR MEASURING DISTANCES AND
DIRECTIONS OF DISTANT OBJECTS
Filed Oct. 12, 1955

INVENTOR.
ANDREW ALFORD
BY
EZEKIEL WOLF
HIS ATTORNEY.

United States Patent Office 3,028,593
Patented Apr. 3, 1962

3,028,593
DEVICE FOR MEASURING DISTANCES AND
DIRECTIONS OF DISTANT OBJECTS
Andrew Alford, Winchester, Mass.
Filed Oct. 12, 1955, Ser. No. 540,000
3 Claims. (Cl. 343—17.1)

The invention disclosed herein relates to the measurement of distances and directions by means of high frequency electromagnetic waves. Broadly speaking, it comprises in combination a source of high frequency waves, a means for sending these waves as guided waves along a plurality of transmission lines, means for delaying the waves separately in each of these transmission lines, a means for amplifying the waves, a means for radiating the waves into space, a means for receiving the waves reflected from a distant object, and adjustable or continuously varying means for delaying the waves received by individual antenna elements by different amounts so that the waves received by a group of antenna elements would arrive in synchronism with each other and, therefore, add at the receiver.

It has been customary in the past to draw a distinct line of demarcation between the means for generating high frequency power and radiating means. For example, it has been the practice to start out with an oscillator in which high frequency waves are produced, then to employ a series of amplifiers, doublers, triplers, etc., to obtain the desired amount of high frequency power at the desired frequency at a pair of output terminals of the transmitter. From the output terminals of the transmitter the waves are conducted along high frequency transmission lines to an antenna which converts guided waves into free waves in space. If the antenna consisted of a plurality of radiating elements which are to be energized in certain relative phases, the phasing means, such as, for example, variable delay lines or fixed R.F. circuits are introduced into high frequency transmission lines between the output terminals of the transmitter and the antenna elements. According to this system used in the past, it is necessary that all of the power pass through one pair of transmitter output terminals. If the desired amount of high frequency power is large, it is necessary to use a number of vacuum tubes in parallel or in push pull in parallel or both, only to connect the outputs together to one pair of terminals and then, in order to feed a number of antenna elements, split this power again into a number of channels. This process of squeezing of a large amount of high frequency power through one pair of terminals presents a variety of problems when the total power to be generated and radiated is very large. The reliability of the system as a whole depends primarily on the reliability of the output stage of the transmitter. Should one of the tubes in this stage fail, usually no signal is radiated.

In the system of the present invention, the ultra high frequency waves are generated in the conventional manner; for example, these waves are passed through amplifiers, doublers and/or triplers so as to obtain the desired frequency and at the certain power level. This power level in the system of the present invention is lower than the power level which is to be radiated; for example, only one-tenth of the latter amount. The combination comprising the source of high frequency waves, that is, the oscillator frequency multipliers, if needed, and if needed, an amplifier, will be called a common driver. The power delivered by the common driver is divided into a plurality of transmission lines; for example, thirty-two separate lines. In each of the transmission lines is inserted a variable delay line which is capable of controlling the phase of the power passing through it. The power flowing in each of these separate lines, called sub-feeders, is then amplified in a separate amplifier comprising a conventional R.F. amplifier consisting, for example, of two tubes in push pull connection. The power emerging from these separate amplifiers is then delivered to an element of the antenna. For example, if there are thirty-two amplifiers there would be thirty-two separate elements in the antenna.

The improvement in the present invention over the prior art is that the initial common driver of power source is small and that large power output is obtained by using a plurality of separate channels into which the common driver or power source is divided for independent time delay or phase control before amplification for ultimate large total power output to the antenna elements.

In the companion patent application of Lindsay Russell, Serial No. 451,754, filed August 24, 1954, now Patent No. 2,968,808, there is particularly described a system employing a group of thirty-two antenna units arranged around two concentric circles with delay lines between the antennas and the receiver amplifiers for bringing the phase of the signals picked up at the antenna into coincidence at receiver amplifier.

In the system according to the present invention, there is a common driver source which supplies a comparatively small amount of high frequency power through delay lines to each line branch where the amplifier is connected into the circuit to increase the power output to the desired magnitude.

The relative phase of the power delivered to each of the antenna elements is controlled primarily by the variable delay lines inserted into the sub-feeders, that is, between the common driver and each of the final amplifiers connected between a sub-feeder and the antenna element feeder.

The advantage of this system is that very large amounts of power can be radiated without the necessity of dealing with very high voltages, or with very large amounts of high frequency power in any one feeder, or in any one amplifier. A further advantage of this system is that such components as variable delay lines are not called upon to operate at very high power levels. For example, assume that the common driver delivers 32 kilowatts, then each of the say thirty-two sub-feeders would carry only 1 kilowatt. If an amplifier feeding each of the individual antenna elements produces a power amplification of say 15, then each antenna element would get approximately 15 kilowatts and the total radiated pattern would be around 480 kilowatts.

The antenna elements could be arranged in the form of a linear array provided with a reflecting curtain. With this arrangement, the delay lines in the sub-feeders could be used to produce in the antenna elements currents in such phases that a beam at right angles to the line of the array or at some other desired angle to the array line could be radiated and, in fact, moved back and forth if desired. In this manner, a beam whose direction is controllable in azimuth could be obtained.

Again, if desired, the individual antenna elements could be arranged in two concentric circles with sixteen elements in each circle. In this case, the elements could be so phased that the radiated beam could be rotated through an angle of 360° by changing the delays introduced by the plurality of the variable delay lines in the sub-feeders. In still another arrangement, the antenna elements could be in the form of an arc of a circle and provided with a reflecting curtain. Again, also in the form of an arc, by introducing a proper phase delay by means of the variable delay lines into each of the sub-feeders, the beam could be turned at will within certain limits established by the length of the arc and its curvature.

In accordance with the present invention, the antenna array which is used to transmit high frequency pulse signals may be used to receive signals arriving from a distant object or objects. For this purpose each transmission line used to connect an amplifier with its radiating element is provided with a TR and an anti TR combination and a branch line functioning as a duplex. Each such branch line is connected to the input terminals of a variable delay line. The output terminals of the delay lines are connected to a receiver.

While a pulse is being sent out by the amplifier, the TR, anti TR combination does not allow the RF power to enter the branch lines. During intervals of time between pulses, the receiver is effectively connected to the radiating elements of the array through a group of variable delay lines. The delays introduced by the individual delay lines are adjusted so that the signals arriving from the direction illuminated by the transmitted beam arrive at the receiver in the same relative phase. Thus, in accordance with the present invention there are two groups of delay lines. One group is used to form a transmitted beam and another group is used to produce a receiving beam.

This invention in the present application will be more clearly understood when read in connection with the sketches showing schematically the system of the present invention comprising:

FIGURE 1 which shows a schematic diagram, and

Figure 2:
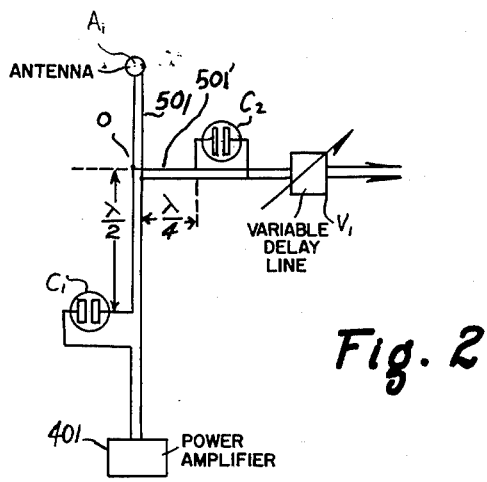

FIGURE 2 which shows a schematic circuit for transmission and reception.

As illustrated in FIGURE 1, the system may comprise a plurality of antenna units or elements. These antenna units may be supplied with radio frequency power through a common driving source 1 and impedance matching transformer 2, variable delay lines 301, 302, 303 and 30N, which connect each to its own amplifier 401, 402, 403 and 40N, which are in turn connected to the antenna units, A1, A2, A3 and AN, respectively. These units may be arranged in any kind of an array, such as, a straight line, circle or some other curve.

Between the antenna units and the amplifiers are combined TR and anti-TR units which may be contained in the same box or structure shown as the units marked TR in the drawings. The TR and anti-TR units are used in the usual manner; for instance, as shown in "Radar System Engineering" Ridenour (McGraw-Hill) 1st edition, page 407 and in paragraphs 11–5.

When the antenna is receiving waves, the ATR unit in the transmission line remains open showing, therefore, an open circuit to the received waves while the shunt TR across the receiver is also open and the waves are, therefore, permitted to pass down through to the receivers. On the other hand, when the transmitter is transmitting over the line to the antenna units, the ATR unit breaks down and so also the TR unit which short-circuits the receiver line, thus blocking waves from passing down the receiver line which might damage the receiver, thereby permitting the transmitter to transmit its waves directly to the antenna unit.

An effective system to accomplish this result is to provide a short circuiting TR unit acros the receiving line one-quarter of a wave length from the transmission line connection. This provides a short circuit across the receiver at the point where the unit is connected, but an open circuit across the transmission line so that the waves may be transmitted outward from the transmitter to the antenna unit.

When waves are received on the antenna unit, they pass down the line, but since the anti-TR units have already been restored, that is, made an open circuit, the waves will not travel down the transmitter lines but will be directed to the receiving lines, across which the open TR tube will have no effect so that at the connection of the receiver line to the coaxial transmission line, an open circuit is provided whereby the electro-magnetic waves pass through the receiver uneffected by other lines.

When the system is used for reception, the signal is received on the antennas A1, A2, A3, AN, and transmitted over the lines 501, 502, 503, 50N, through the TR box whereupon the signal is directed or shunted over the line 601, 602, 603, 60N to the variable delay receiver line V1, V2, V3, VN and thence to the receiver R.

The variable delay lines V1, V2, V3, VN and 301, 302, 303, 30N may be respectively controlled by control handles V and 30, which may be operated synchronously by a shaft 31 or which may be operated independently, if desired. The operating handles V and 30, whichever may be used, may be set with some phase angle between transmission and reception so that the direction of transmission will follow in the direction of reception at a certain time interval.

If the system is used for radar, the transmitted signal is in the form of a pulse controlled by a magnetron type of tube wherein the transmission of the pulse is synchronized on a measuring means such as a cathode ray tube wherein the travel of the cathode beam across the tube measures the distance to the reflecting object from which the beam is returned. The direction may also be indicated on the cathode ray tube by the position of the beam with respect to the reference axes of the tube.

Where the system is used in radar for reception of a reflected signal, the delay between the transmitting delay line and receiving delay line should be made comparable to the distance or space through which the waves are transmitted and reflected. For instance, if a signal is to be received from a point a thousand miles away, the reflected distance over which the wave would have to travel would be two-thousand miles, which amounts to about one-hundredth of a second in time. Therefore, the phasing between V and 30 would have to be one-hundredth of a second in order to have the variable delay line direct the antennas for the direction in which the wave was transmitted. The delay between transmission and reception phase in the variable delay line may be manually set by adjusting the angle between V and 30, or it may be automatically controlled if desired.

Generally, however, there need be no delay between transmission and reception phase since the transmitted beam may be rotated at a slow enough interval so that the units will be properly compensated to receive the reflected signal as it returns. For instance, if there is one complete rotation of the beam in twelve seconds and the beam is two degrees wide, then there would be a time interval of $\frac{1}{15}$ second between the transmission and reception for the reflection from the further distance which corresponds to $10^6$ meters or about 6,000 miles which is a sufficient allowance for maximum range.

FIGURE 2 indicates diagrammatically how the system may operate to control either transmission or reception. FIGURE 2 shows just one antenna unit with its connection for transmission and reception. The antenna unit A1 is connected to the amplifier 401, through the transmission line 501. The TR unit, in this case, comprises a gaseous discharge tube $C_2$ which is connected across the transmission line at a ¼ wave length $$\frac{(\lambda)}{4}$$

from the point where the line is connected to the receiver. The anti-TR tube may comprise a similar gaseous discharge tube, and this is set at one-half wave length along the transmission line from the receiver line connection. When a signal is received on the antenna A1, the anti-TR tube $C_1$ remains as it is to provide an open circuit in the transmission line and so also the TR tube $C_2$ to permit the signal to travel down the receiver lines. Therefore, all of the energy passes through the line 501' to the receiver rather than to the transmitter. When the transmitter is operating, the connection $C_2$ across the receiver line acts as a short ¼ wave length from the connection of the line 501 at 0 and, therefore, acts as an open circuit at the point 0, so that no energy from the transmitter is sent to the receiver circuit.

There are many types of TR and anti-TR tubes which can be used. These for the most part comprise either condensers or diodes or some combined circuit of condensers and diodes or similar types of elements providing the proper shorting of transmitted or received signal.

The system may be operated with any high or ultra high frequency signal or with a signal in a very narrow frequency band, and similarly, the angle of direction is very closely controlled so that the direction of transmission and reception will be well established.

In the operation of the system, therefore, the transmitter may operate in distinct pulse intervals spaced apart so that between the transmitted signals, the receiver may operate to pick up and receive the reflected signal. In order to pick up or receive reflected signals from a great distance, it may be desirable to control the delay between the time of transmission and the time of reception. This may be done completely and wholly by varying the time of delay between the receiving variable delay lines and the transmitting variable delay lines. This delay is controlled similarly in each system, that is, the interval corresponding between the reception for the signal on the antenna units is the same as the interval corresponding to the transmission on the same antenna units, so that as the beam is rotated around through 360°, the phase may be retarded between transmission and reception, so that a signal from any direction may be picked up and received. This may be useful in radar for receiving echoes from very great distances in the thousands of miles where the reflected objects which reflect the signal back to the receiver is not known in position or distance so that the operator must be able to delay the delay lines, the proper interval so that the signals picked up by the antenna units will be brought in phase at the receiver.

Having now described my invention, I claim:

1. High frequency echo ranging apparatus comprising, a source of pulses of high frequency energy, a plurality of radiating elements, a like plurality of power amplifiers, a like plurality of means for coupling said pulses to the inputs of respective power amplifiers, each of the latter coupling means including variable means for imparting a controllable delay to energy of said high frequency, a like plurality of duplexer coupling means for transferring energy from a respective power amplifier to a respective radiating element and for transferring received energy from a respective radiating element to a receiving system, a receiver, a like plurality of means for coupling received energy from respective ones of said duplexer coupling means received by a respective radiating element to said receiver, each of the latter received energy coupling means including variable means for imparting a controllable delay to energy of said high frequency.

2. A method of echo ranging which method includes the steps of repetitively radiating synchronized pulses of high frequency energy from a plurality of radiating elements in controlled transmitted relative R.-F. phase while varying said transmitted relative phase to cause the resultant beam of energy produced by said synchronized radiated pulses to sweep through a predetermined sector of space at a rate which is slow compared to the repetition rate of said radiated pulses, thereby causing echo signal to be reflected from distant objects toward said radiating elements, receiving said echo signals with said radiating elements, and delivering said received echo signals to a common receiver in controlled relative received R.-F. phase different from said transmitted R.-F. relative phase while varying said received relative phase to cause the effective combined directional reception pattern of said radiating elements to sweep through said predetermined sector of space in synchronism with the movement of said resultant beam.

3. A method in accordance with claim 2 wherein the orientation of said directional reception pattern contemporaneous with that of said resultant beam is behind the latter along the path followed thereby.

References Cited in the file of this patent

UNITED STATES PATENTS

| | | |
|---|---|---|
| 1,620,655 | Heising | Mar. 15, 1927 |
| 1,667,792 | Martin | May 1, 1928 |
| 1,960,630 | Heintz et al. | May 29, 1934 |
| 2,401,575 | MacAdam | June 4, 1946 |
| 2,407,169 | Loughren | Sept. 3, 1946 |
| 2,464,276 | Varian | Mar. 15, 1949 |
| 2,466,354 | Bagnall | Apr. 5, 1949 |
| 2,527,753 | McConnell | Oct. 31, 1950 |
| 2,746,018 | Sichak | May 15, 1956 |
| 2,824,227 | Richman | Feb. 18, 1958 |
| 2,859,414 | Lundry | Nov. 4, 1958 |

FOREIGN PATENTS

| | | |
|---|---|---|
| 604,592 | Great Britain | July 7, 1948 |